United States Patent
Kim et al.

(10) Patent No.: US 12,530,141 B2
(45) Date of Patent: Jan. 20, 2026

(54) STORAGE SYSTEM, STORAGE DEVICE, AND BOOTING METHOD

(71) Applicant: SAMSUNG ELECTRONICS CO., LTD., Suwon-si (KR)

(72) Inventors: Minkyu Kim, Suwon-si (KR); Hyunwook Shin, Suwon-si (KR); Kyoung Baek Lee, Suwon-si (KR); Hayeong Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/892,923

(22) Filed: Sep. 23, 2024

(65) Prior Publication Data
US 2025/0231702 A1  Jul. 17, 2025

(30) Foreign Application Priority Data

Jan. 12, 2024 (KR) .......................... 10-2024-0005515

(51) Int. Cl.
*G06F 3/06* (2006.01)

(52) U.S. Cl.
CPC .......... *G06F 3/0632* (2013.01); *G06F 3/0619* (2013.01); *G06F 3/0679* (2013.01)

(58) Field of Classification Search
CPC ..... G06F 3/0632; G06F 3/0619; G06F 3/0679
See application file for complete search history.

(56) References Cited

U.S. PATENT DOCUMENTS

| | | | |
|---|---|---|---|
| 9,293,209 B2 | 3/2016 | Ahn et al. | |
| 10,373,693 B2 | 8/2019 | Cha et al. | |
| 10,510,405 B2 | 12/2019 | Barndt et al. | |
| 10,558,381 B2 | 2/2020 | Chin et al. | |
| 11,327,897 B2 | 5/2022 | Park et al. | |
| 11,392,322 B2 | 7/2022 | Kim | |
| 11,699,500 B2 * | 7/2023 | Lee | G11C 29/4401 365/185.09 |
| 11,749,351 B2 | 9/2023 | Lee et al. | |
| 2015/0026538 A1 * | 1/2015 | Sakai | G11B 20/1833 714/764 |
| 2019/0108091 A1 * | 4/2019 | Chen | G06F 11/1068 |
| 2020/0142619 A1 * | 5/2020 | Ke | G06F 3/0679 |
| 2020/0371878 A1 * | 11/2020 | Chaiken | G06F 9/4401 |
| 2021/0294524 A1 * | 9/2021 | Lin | G06F 3/0659 |
| 2022/0326884 A1 * | 10/2022 | Kang | G06F 13/28 |
| 2023/0087462 A1 * | 3/2023 | Yoon | G06F 3/0658 713/173 |
| 2025/0085876 A1 * | 3/2025 | Majerus | G06F 3/0679 |

FOREIGN PATENT DOCUMENTS

| | | |
|---|---|---|
| KR | 10-2021-0090439 | 7/2021 |
| KR | 10-2022-0128796 | 9/2022 |

* cited by examiner

*Primary Examiner* — Edward J Dudek, Jr.
(74) *Attorney, Agent, or Firm* — Fish & Richardson P.C.

(57) ABSTRACT

A method of booting a storage system includes performing device booting of a storage device including a non-volatile memory device, determining whether a history level update message indicating that a read failure or a read retry has occurred in the non-volatile memory device is transmitted from the storage device to a host during the device booting, and requesting, by the host, the storage device to perform a pre-read operation to adjust the optimal read level of the non-volatile memory device according to the history level update message. The pre-read operation is performed during a system booting section of the storage system.

20 Claims, 14 Drawing Sheets

FIG. 8

| | Pre-Read Information | | | | | | |
|---|---|---|---|---|---|---|---|
| PRI_0 | PRI_1 | PRI_2 | PRI_3 | PRI_4 | PRI_5 | PRI_6 | PRI_7 |
| PRI_8 | PRI_9 | PRI_10 | PRI_11 | PRI_12 | PRI_13 | PRI_14 | PRI_15 |
| PRI_16 | PRI_17 | PRI_18 | PRI_19 | PRI_20 | PRI_21 | PRI_22 | PRI_23 |
| PRI_24 | PRI_25 | PRI_26 | PRI_27 | PRI_28 | PRI_29 | PRI_30 | PRI_31 |

FIG. 10

| IDN | Name | FLAGS ||||
| | | Access Property | Type | Default | Description |
| --- | --- | --- | --- | --- | --- |
| 00h | Reserved | - | - | - | - |
| ... | ... | | | | |
| xxh | fOptimalReadLevelSearch | Read / Set only | D | 0 | Device during Optimal Read Level Search Host set fOptRdLvSearch for Device to perform optimal read level search during idle time Device reset flag after optimal read level search completed. 0b: Device optimal read level search completed or not started yet 1b: Device optimal read level search in progress |

STORAGE SYSTEM, STORAGE DEVICE, AND BOOTING METHOD

CROSS-REFERENCE TO RELATED APPLICATIONS

This application claims priority under 35 U.S.C. § 119 to Korean Patent Application No. 10-2024-0005515, filed on Jan. 12, 2024, in the Korean Intellectual Property Office, the disclosure of which is incorporated by reference herein in its entirety.

BACKGROUND

Mobile devices are equipped with storage devices that use NAND flash memory as a storage medium. In the case of mobile devices left in a power-off state for a long period of time, it is known that significant performance degradation occurs during the first storage device read operation immediately after booting. Performance degradation is due to the read retry operation due to the retention characteristics of NAND flash memory.

The read retry operation includes a procedure for finding the optimal read voltage for deteriorated memory cells and an additional read procedure using the optimal read voltage. When the read retry is completed, the storage device stores the determined optimal read voltage. The saved optimal read voltage is applied to subsequent read operations as is. In order to provide high service quality, technology is needed to reduce performance degradation caused by these retention characteristics.

SUMMARY

Implementations of the present disclosure provides a storage system, a storage device, and a booting method capable of searching for an optimal read voltage during booting.

According to some implementations of the present invention, a method of booting a storage system, comprising, performing device booting of a storage device including a non-volatile memory device, determining whether a history level update message indicating that a read failure or a read retry has occurred in the non-volatile memory device is transmitted from the storage device to a host during the device booting, and requesting, by the host, the storage device to perform a pre-read operation to adjust the optimal read level of the non-volatile memory device according to the history level update message, wherein the pre-read operation is performed during a system booting section of the storage system.

According to some implementations of the present invention, a storage device, comprising, a non-volatile memory device, and a storage controller configured to generate a history level update message indicating that a read level change has occurred to transmit to a host when a read failure or read retry event of the non-volatile memory device occurs during a booting operation, wherein the storage controller configured to control the non-volatile memory device to perform an operation to set an optimal read level of the non-volatile memory device in response to a pre-read operation request from the host.

According to some implementations of the present invention, a method of booting a storage system, comprising, resetting a hardware of a storage device and a host controlling the storage device, performing booting of the storage device. checking, by the host, whether a read level update message of a non-volatile memory device from the storage device exists during a booting section of the storage device, generating, by the storage device, pre-read information to apply a read level update among memory areas of the non-volatile memory device, and requesting, by the host, a pre-read operation from the storage device to adjust an optimal read level of the non-volatile memory device, wherein the pre-read operation is performed during a system booting section of the storage system.

BRIEF DESCRIPTION OF THE FIGURES

The above and other objects and features of the present disclosure will become apparent by describing in detail implementations thereof with reference to the accompanying drawings.

FIG. 8 is a table illustrating pre-read information PRI generated in a storage device.

FIG. 10 is a table defining the flag 'fOptimalReadLevelSearch' indicating whether the pre-read operation PRO is completed in the UFS storage device.

DETAILED DESCRIPTION

It is to be understood that both the foregoing general description and the following detailed description are exemplary. Reference signs are indicated in detail in some implementations of the present invention, examples of which are indicated in the reference drawings. Wherever possible, the same reference numbers are used in the description and drawings to refer to the same or like parts.

Figure 1:
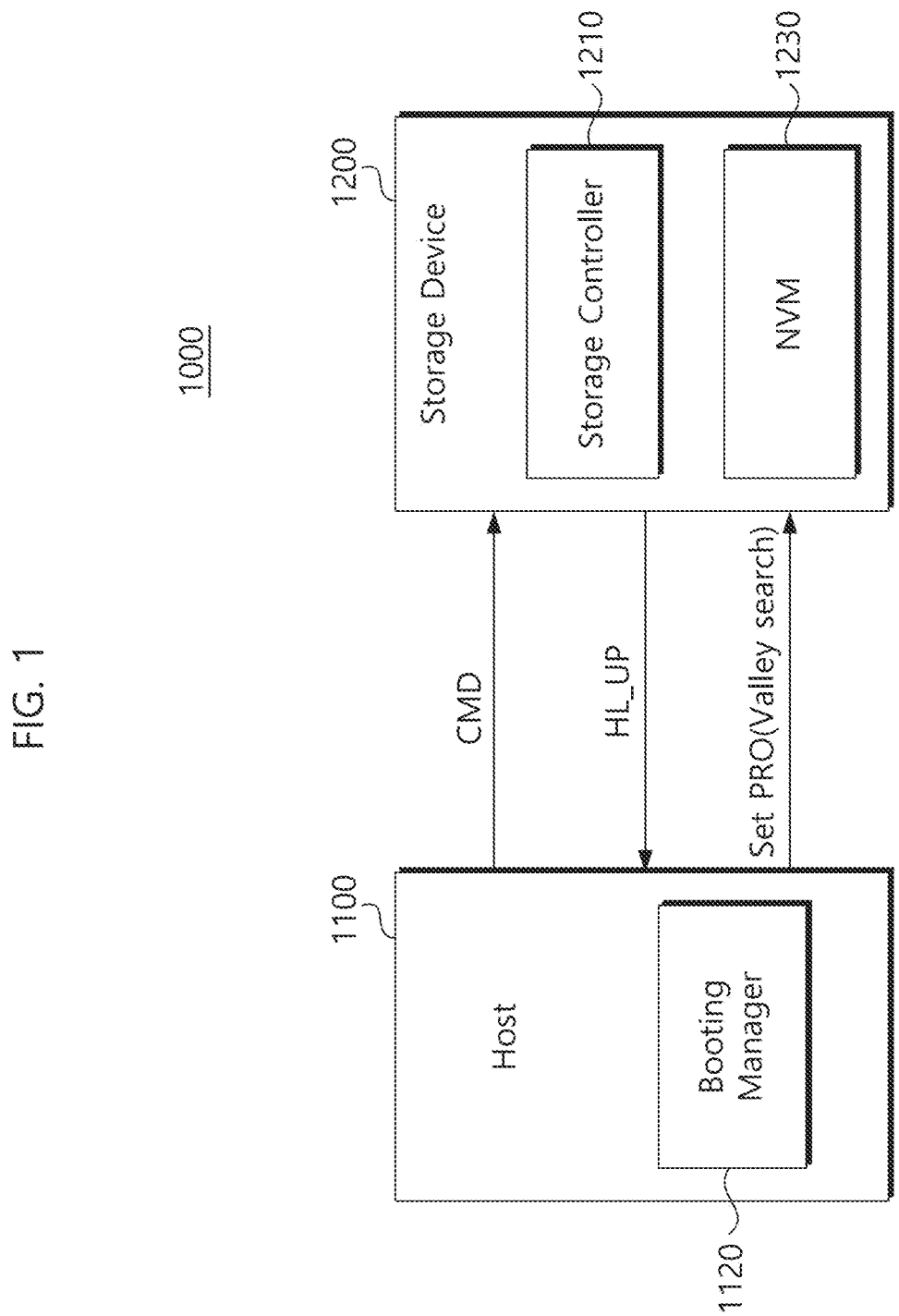
FIG. 1 is a block diagram showing a storage system according to some implementations of the present invention.

FIG. 1 is a block diagram showing a storage system according to some implementations of the present invention. Referring to FIG. 1, the storage system 1000 includes a host 1100 and a storage device 1200. For example, the storage system 1000 may be implemented as a mobile device or computing system.

The host 1100 controls the overall operation of the storage device 1200. The host 1100 writes data to the storage device 1200 or reads data written to the storage device 1200. The host 1100 can access the storage device 1200 and set various operating conditions. The host 1100 can control the storage device 1200 through a command CMD. In particular, during a booting operation, the host 1100 may schedule or set a pre-read operation PRO in response to a history level update HL_UP message from the storage device 1200.

Here, the history level update HL_UP message indicates whether a read level update exists during a booting operation of the storage device 1200. When the storage device 1200 is booted, a read operation occurs according to various requests from the host 1100. However, if the memory area requested to be read is subject to a read retry according to retention characteristics, the read level for the area may be changed to a preset level. If such a change in read level exists, the storage device 1200 transmits a history level update HL_UP message to the host 1100.

In response to the history level update HL_UP message, the host 1100 sets the pre-read operation PRO on the storage device 1200. The pre-read operation PRO refers to an operation in which the storage device 1200 searches for the optimal read voltage for the selected memory area during the booting section. For example, the pre-read operation PRO may be a valley search operation that finds distribution valleys of memory cells. In general, a valley search operation may be performed as a defense code when accessing the non-volatile memory device 1230 after booting is completed. On the other hand, according to some implementations, the host 1100 may request a valley search operation from the storage device 1200 during a booting operation. In some implementations, this operation is referred to as the pre-read operation PRO in that the valley search operation is performed during the booting operation of the storage device 1200, which is before a normal read operation.

The host 1100 includes a booting manager 1120 that sets the pre-read operation PRO in response to a history level update HL_UP message from the storage device 1200. The booting manager 1120 can control the boot procedures of the storage system 1000 and schedule the pre-read operation PRO performed during the booting operation. Although not shown, the booting manager 1120 may receive pre-read information PRI including address information of the deteriorated memory area from the storage device 1200. The booting manager 1120 may schedule the pre-read operation PRO based on pre-read information PRI.

The storage device 1200 may be provided as a storage medium of the storage system 1000. The storage device 1200 writes data to the non-volatile memory device 1230 or reads stored data in response to various data write and read requests. The storage device 1200 includes a storage controller 1210 and a non-volatile memory device 1230.

The storage controller 1210 may be configured to control the non-volatile memory device 1230. For example, the storage controller 1210 may write data to the non-volatile memory device 1230 or read data stored in the non-volatile memory device 1230 at the request of the host 1100. To access the non-volatile memory device 1230, the storage controller 1210 may provide commands, addresses, data, and control signals to the non-volatile memory device 1230.

In particular, the storage controller 1210 generates the history level update HL_UP message during the device booting section. Device booting refers to hardware and software booting of the storage device 1200. If a read failure or read retry occurs in the memory area requested to be read during the device booting section, the storage controller 1210 transmits the history level update HL_UP message to the host 1100. Here, it has been described that the history level update HL_UP message is generated during device booting, but the present invention is not limited thereto. In other words, the history level update HL_UP message can be generated in the runtime of the general storage device 1200 after device booting or overall system booting is completed. In this case, the host 1100 can check the history level update HL_UP message or flag and determine whether to execute the pre-read operation PRO to adjust the optimal read voltage.

In some implementations, the storage controller 1210 may generate pre-read information PRI at the request of the host 1100. Pre-read information PRI may be address information about a memory area to adjust the read voltage according to retention characteristics. According to the generated pre-read information PRI, the storage controller 1210 may perform the pre-read operation PRO to adjust the optimal read voltage. In some implementations, the generated pre-read information PRI is provided to the host 1100, and the storage controller 1210 passively performs the valley search or pre-read operation PRO for the requested memory area according to the scheduling of the host 1100. The pre-read operation PRO will be explained in more detail through the drawings described later.

The storage controller 1210 may also include a flash translation layer FTL that performs garbage collection. By using the flash translation layer FTL, the shortcomings of the non-volatile memory device 1230, such as erase-before-write and mismatch between erase units and write units, can be compensated. In addition, the flash translation layer FTL maps the logical address generated by the file system of the host 1100 to the physical address of the non-volatile memory device 1230. In addition, the flash translation layer FTL performs wear leveling to manage the lifespan of the non-volatile memory device 1230 and garbage collection to manage data capacity.

The non-volatile memory device 1230 may store data received from the storage controller 1210 or transmit the stored data to the storage controller 1210 under the control of the storage controller 1210. The non-volatile memory device 1230 may include a plurality of memory blocks. Each of the plurality of memory blocks may have a three-dimensional memory structure in which word line layers are stacked in a vertical direction on the substrate. The non-volatile memory device 1230 includes a plurality of memory cells that store data. The threshold voltage of memory cells may change over time since they were programmed due to retention characteristics. In order to ensure data reliability, the read level or read voltage must be adjusted according to changes in the threshold voltage of memory cells. In some implementations, adjustment of the read voltage for memory cells of the non-volatile memory device 1230 may be performed during the booting section.

According to the above-described configuration, the storage system 1000 can perform the pre-read operation PRO to search and set the optimal read voltage of the storage device 1200 in the booting section. Accordingly, performance degradation due to read failure or read retry due to retention characteristics that may occur in the storage device 1200 can be prevented by the pre-read operation PRO performed in the booting section.

Figure 2:
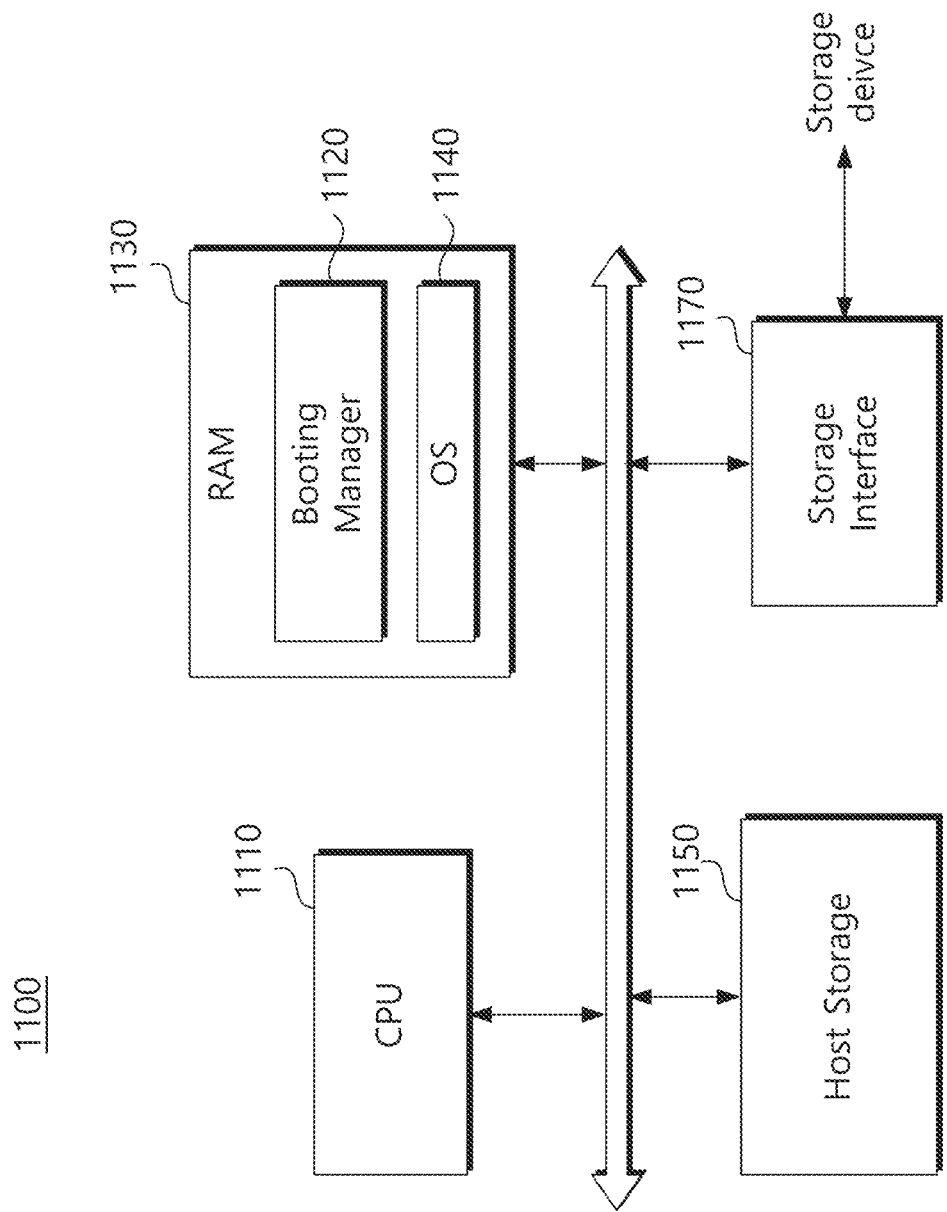
FIG. 2 is a block diagram exemplarily showing the host of FIG. 1.

FIG. 2 is a block diagram exemplarily showing the host of FIG. 1. Referring to FIG. 2, the host 1100 includes a CPU 1110, RAM 1130, host storage 1150, and a storage interface 1170.

The CPU 1110 can execute software such as various application programs or an operating system OS to control the hardware of the host 1100. In particular, the booting manager 1120 may be included among various applications loaded into the RAM 1130. During a booting operation, the CPU 1110 receives a history level update HL_UP message provided from the storage device 1200 according to the execution of the booting manager 1120. In addition, the CPU 1110 may request or set a pre-read operation PRO to the storage device 1200 in response to the history level update HL_UP message. Additionally, the CPU 1110 may provide various commands, such as a set feature command, a read command, and a write command, to the storage device 1200 through the storage interface 1170. The CPU 1110 may be implemented in a multi-core form.

Software or data for controlling various components of the host 1100 are loaded into the RAM 1130. Software and data loaded into RAM 1130 are executed or processed by CPU 1110. Various application programs, including the operating system 1140, may be loaded into the RAM 1130. In particular, the RAM 1130 may be loaded with a booting manager 1120 that manages the pre-read operation PRO to adjust the read voltage of the non-volatile memory device 1230 (see FIG. 1) in the booting section.

The host storage 1150 may store log data or various state data collected from the host 1100. In particular, pre-read information PRI provided from the storage device 1200 during a booting operation may be stored in the host storage 1150. In some implementations, the booting manager 1120 may manage the boot schedule of the storage system 1000 based on pre-read information PRI stored in the host storage 1150. For example, the booting manager 1120 may request the pre-read operation PRO during an idle time when there is no access to the storage device 1200 during the booting operation.

The storage interface 1170 provides a communication interface between the host 1100 and the storage device 1200. The storage interface 1170 may apply one of various standard interfaces. Here, the standard interfaces include at least one of ATA (Advanced Technology Attachment), SATA (Serial ATA), e-SATA (external SATA), SCSI (Small Computer Small Interface), SAS (Serial Attached SCSI), PCI (Peripheral component Interconnection), and PCIe (PCI Express), USB (Universal Serial Bus), IEEE 1394, UFS (Universal Flash Storage), eMMC (Embedded Multi Media Card), NVMe, NVMe-of, NVMe-MI, etc.

According to the above configuration of the host 1100, the host 1100 can be set to perform the pre-read operation PRO to search for the optimal read voltage of the non-volatile memory device 1230 during the booting operation. In other words, the optimal read voltage of the non-volatile memory device 1230 may be updated by the host 1100 during the booting section. Accordingly, after booting is completed, performance degradation due to retention characteristics in the storage device 1200 can be prevented.

Figure 3:
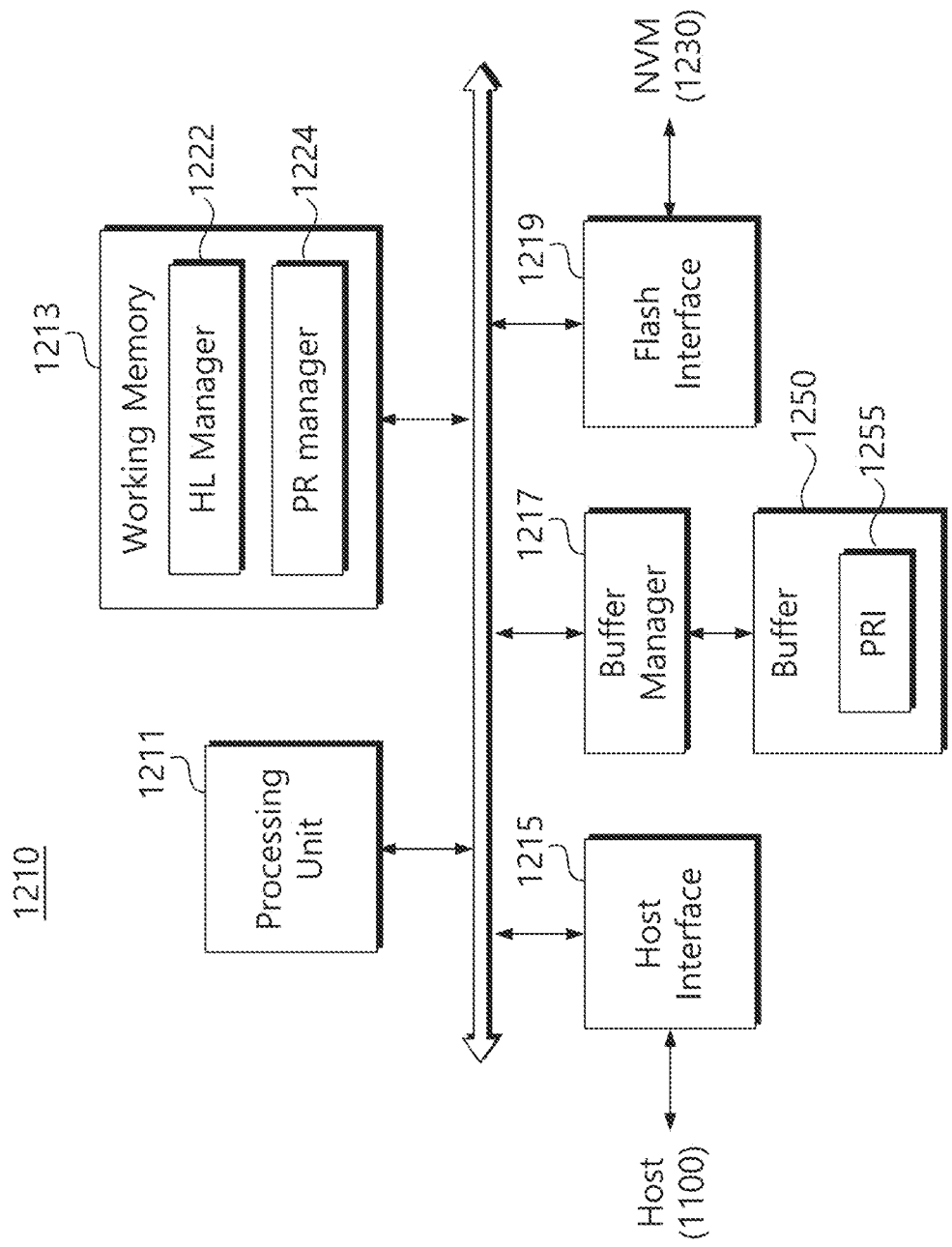
FIG. 3 is a block diagram showing the configuration of the storage controller of FIG. 1 in more detail.

FIG. 3 is a block diagram showing the configuration of the storage controller of FIG. 1 in more detail. Referring to FIG. 3, the storage controller 1210 includes a processing unit 1211, a working memory 1213, a host interface 1215, a buffer manager 1217, a flash interface 1219, and a buffer 1250. However, it will be understood that the components of the storage controller 1210 are not limited to the components shown. For example, the storage controller 1210 may further include a read only memory ROM that stores code data required for a booting operation or an error correction code ECC block.

The processing unit 1211 may be implemented as a central processing unit or microprocessor. The processing unit 1211 may execute software or firmware running on the storage controller 1210. In particular, the processing unit 1211 can drive various firmware or software loaded into the working memory 1213. For example, the processing unit 1211 may execute the history level manager 1222 or the pre-read manager 1224 loaded into the working memory 1213. In addition, the processing unit 1211 may execute firmware or software responsible for core functions of the storage device 1200, such as a host interface layer HIL or a flash translation layer FTL.

Software (or firmware) or data for controlling the storage controller 1210 is loaded into the working memory 1213. Software and data loaded into the working memory 1213 are driven or processed by the processing unit 1211. In particular, according to some implementations of the present invention, the history level manager 1222 and the pre-read manager 1224 may be loaded into the working memory 1213. Alternatively, a flash translation layer FTL including the functions of the history level manager 1222 or the pre-read manager 1224 may be loaded into the working memory 1213.

The history level manager 1222 driven by the processing unit 1211 may be loaded into the working memory 1213 when the storage device 1200 is booted or initialized. When the history level manager 1222 is driven by the processing unit 1211, the occurrence of read failure or read retry of the non-volatile memory device 1230 is monitored. If read failure or read retry is detected, the history level manager 1222 transmits a history level update HL_UP message to a host 1100. If a read failure occurs while performing a read request to the non-volatile memory device 1230, the non-volatile memory device 1230 performs the read retry with a changed read voltage. This update of the read voltage may be repeated multiple times. When a change in the read voltage of the non-volatile memory device 1230 is detected, the history level manager 1222 transmits a history level update HL_UP message to the host 1100. Here, the generation time of the history level update HL_UP message or flag is not limited to the device booting section or the system booting section. For example, the history level manager 1222 can generate a history level update HL_UP message or flag at the runtime of the storage device 1200 after device booting or entire system booting is completed.

The pre-read manager 1224 may generate pre-read information PRI, which is address information for memory cells that require valley search (or pre-read operation), at the request of the host 1100. The pre-read manager 1224 may generate addresses of memory areas in which data is written or memory areas to be accessed after booting is completed among the memory areas of the non-volatile memory device 1230 as pre-read information PRI. Pre-read information PRI may be address information of memory cells whose read voltage level must be adjusted through valley search. The range of memory cells provided as pre-read information PRI can be set in various ways. In some implementations, the address of the memory area accessed first after booting is completed may be provided as pre-read information PRI. Alternatively, the pre-read information PRI may include address information for all memory areas in which valid data is written.

In some implementations, the pre-read manager 1224 may transmit pre-read information PRI to the host 1100 at the request of the host 1100. In some implementations, the pre-read manager 1224 may use the pre-read information PRI as valley search information to search for an optimal read voltage without transmitting the pre-read information PRI to the host 1100. The pre-read manager 1224 may perform a valley search or pre-read operation PRO to search and determine the optimal read voltage based on pre-read information PRI according to a command or flag setting of the host 1100.

The host interface 1215 provides an interface between a host and the storage controller 1210. The host and the storage controller 1210 may be connected through one of various standard interfaces. Here, the standard interfaces are at least one of ATA (Advanced Technology Attachment), SATA (Serial ATA), e-SATA (external SATA), SCSI (Small Computer Small Interface), SAS (Serial Attached SCSI), PCI (Peripheral component Interconnection), and PCIe (PCI Express), USB (Universal Serial Bus), IEEE 1394, UFS (Universal Flash Storage), eMMC (Embedded Multi Media Card), and NVMe.

The buffer manager 1217 controls read and write operations of a buffer 1250 such as DRAM. For example, the buffer manager 1217 controls the buffer 1250 to provide a buffer function for temporarily storing data programmed in the non-volatile memory device 1230 or data output from the non-volatile memory device 1230.

The buffer 1250 provides buffer memory to the storage controller 1210. In the buffer 1250, for example, pre-read information 1255 generated by the pre-read manager 1224 may be stored and updated. Pre-read information 1255 may be transmitted to the host 1100 in response to a buffer read command from the host 1100. The buffer 1250 is a separate device from the storage controller 1210 and may be mounted outside the storage device 1210.

The flash interface 1219 provides an interface between the storage controller 1210 and the non-volatile memory device 1230. For example, data processed by the processing unit 1211 is stored in the non-volatile memory device 1230 through the flash interface 1219. In some other implementations, data stored in the non-volatile memory device 1230 may be exchanged with the storage controller 1210 through the flash interface 1219.

According to the function of the storage controller 1210, when booting or initializing, the storage controller 1210 may experience a read failure or read retry when accessing the non-volatile memory device 1230. In this case, a history level update HL_UP message is transmitted to the host 1100. Additionally, the storage controller 1210 may generate pre-read information PRI according to the request from the host 1100 and transmit the generated pre-read information PRI to the host 1100. The storage controller 1210 may perform the pre-read operation PRO to search for and set an optimal read voltage based on pre-read information PRI at the request of the host 1100. All of these operations are applicable to the booting section of the storage system 1000 and the idle time of the storage device 1200. Accordingly, the optimal read voltage of memory cells can be set without deteriorating booting performance. In addition, performance degradation of the storage device 1200 due to retention characteristics after booting is completed can be effectively prevented.

Figure 4:
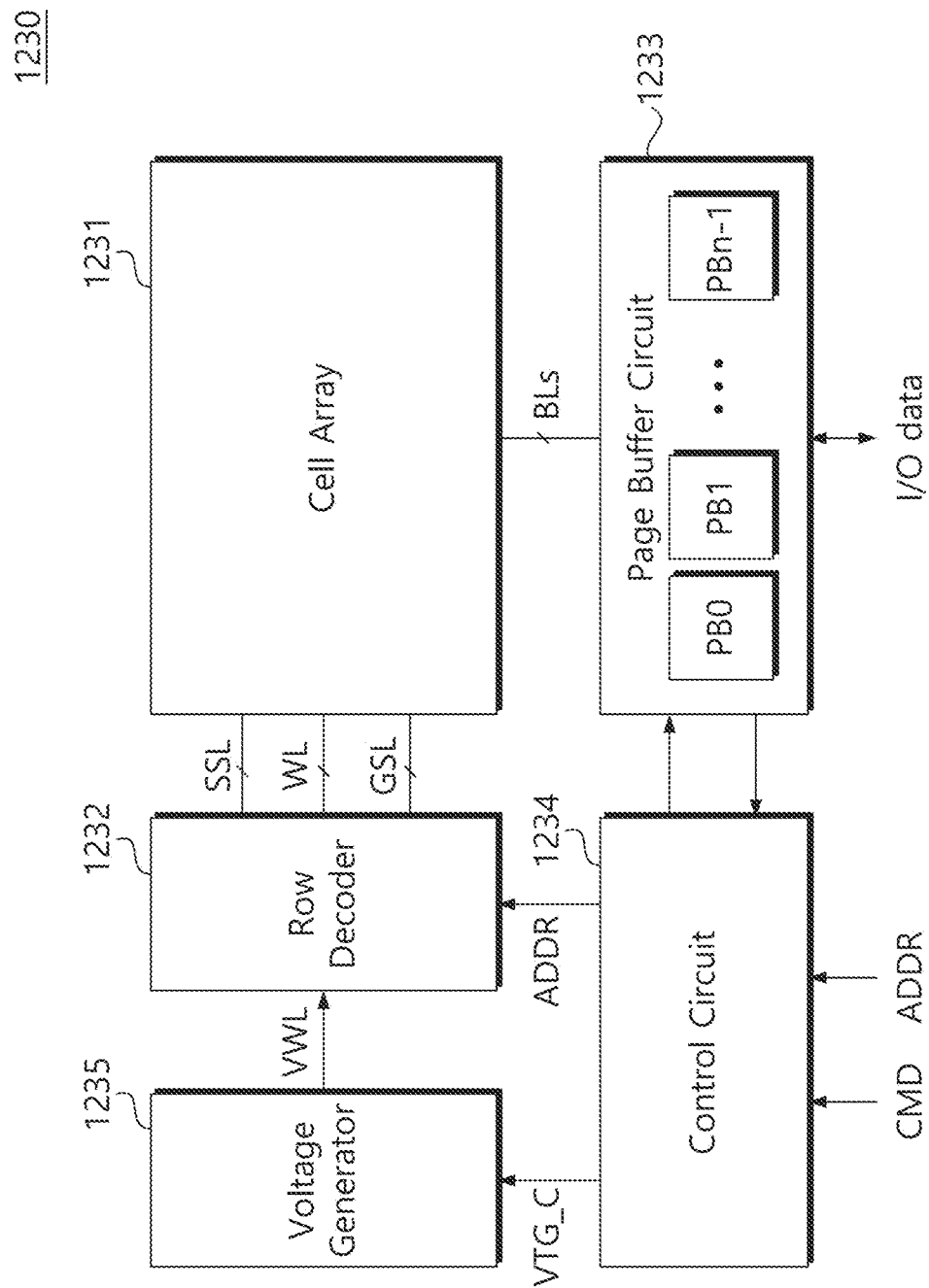
FIG. 4 is a block diagram showing the structure of the non-volatile memory device of FIG. 1.

FIG. 4 is a block diagram showing the structure of the non-volatile memory device of FIG. 1. Referring to FIG. 4, the non-volatile memory device 1230 includes a cell array 1231, a row decoder 1232, a page buffer circuit 1233, a control logic circuit 1234, and a voltage generator 1235. Although not shown in FIG. 4, the non-volatile memory device 1230 may further include a data input/output circuit or an input/output interface. Additionally, the non-volatile memory device 1230 may further include components such as column logic, a pre-decoder, a temperature sensor, a command decoder, and an address decoder.

The cell array 1231 may include a plurality of memory blocks. Each of the plurality of memory blocks may include a plurality of memory cells. A plurality of memory blocks may be included in one memory plane, but the present invention is not limited thereto. The cell array 1231 may be connected to the page buffer circuit 1233 through bit lines BL, and may be connected to row decoder 1232 through word line WL, string select line SSL, and ground select line GSL. In some implementations, the cell array 1231 may include a three-dimensional memory cell array.

The row decoder 1232 may select one of the memory blocks of the cell array 1231 in response to the address ADDR. The row decoder 1232 may select one of the word lines of the selected memory block in response to the address ADDR. The row decoder 1232 delivers a word line voltage VWL corresponding to the operation mode to the word line of the selected memory block. During a program operation, the row decoder 1232 transmits the program voltage and verification voltage to the selected word line and the pass voltage to the unselected word line. During a read operation, the row decoder 1232 delivers a read voltage to the selected word line and a read pass voltage to the unselected word line.

The page buffer circuit 1233 includes a plurality of page buffers PB0 to PBn−1. A plurality of page buffers PB0 to PBn−1 may be respectively connected to memory cells through a plurality of bit lines BLs. The page buffer circuit 1233 may select at least one bit line among the bit lines BLs in response to the column address. The page buffer circuit 1233 may operate as a write driver or a sense amplifier depending on the operation mode. For example, during a program operation, the page buffer circuit 1233 may apply a bit line voltage corresponding to data to be programmed to the selected bit line. During a read operation, the page buffer circuit 1233 may detect data stored in a memory cell by detecting the current or voltage of the selected bit line.

The control logic circuit 1234 can generally control various operations within the non-volatile memory device 1230. The control logic circuit 1234 programs data into the cell array 1231 or reads data from the cell array 1231 or erase data stored in the cell array 1231 in response to a control signal CTRL, a command CMD, and/or the address ADDR. The control logic circuit 1234 may generate various control signals to access the cell array 1231. For example, the control logic circuit 1234 may output a voltage control signal VTG_C, an address ADDR, etc. In some implementations, the control logic circuit 1234 may output control signals for programming multi-bit data according to the received control signal CTRL, command CMD, and/or address ADDR.

The voltage generator 1235 may generate various types of voltages to perform program, read, and erase operations based on the voltage control signal VTG_C. For example, the voltage generator 1235 may generate a program voltage, a read voltage, or a program verification voltage as the word line voltage VWL. For example, the program voltage may be generated using an incremental step pulse program ISPP method.

The threshold voltage of memory cells included in the cell array 1231 may change over time depending on retention characteristics. The operation of setting the optimized read voltage corresponding to the changed threshold voltage for these memory cells is the pre-read operation PRO or valley search operation. Through the pre-read operation PRO, the optimal distribution valley of the memory cells can be detected, and the read voltage corresponding to the distribution valley can be determined.

Figure 5:
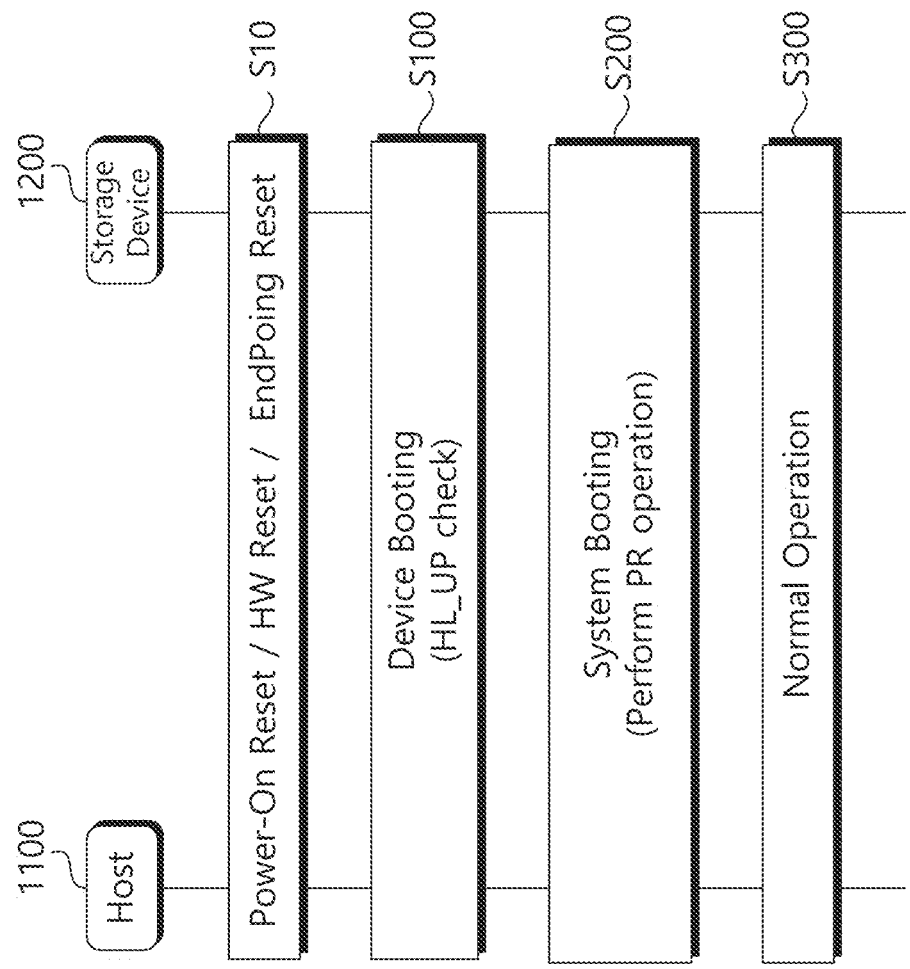
FIG. 5 is a diagram briefly showing the booting procedure of a storage system according to some implementations of the present invention.

FIG. 5 is a diagram briefly showing the booting procedure of a storage system according to some implementations of the present invention. Referring to FIG. 5, the host 1100 can perform normal access to the storage device 1200 after device booting (S100) and system booting (S200) are completed. In particular, the storage system 1000 can check the history level update HL_UP message in the device booting (S100) section and perform a pre-read operation PRO to update the level of the read voltage in the system booting (S200) section. Therefore, in the normal operation (S300) section after the booting procedure is completed, performance degradation due to retention characteristics can be prevented.

In step S10, power is applied to the storage system 1000. Then, the host 1100 and the storage device 1200 perform various hardware reset operations such as power-on reset POR, hardware reset, and endpoint reset.

In step S100, booting of the storage device 1200 is performed. To boot the storage device 1200, the host 1100 may perform hardware initialization of the input/output channels or data transmission/reception circuits of the storage device 1200. For example, hardware layers of each of the host 1100 and the storage device 1200 may be initialized. The storage device 1200 may read metadata stored in the non-volatile memory device 1230 and initialize the operation of the storage controller 1210. At this time, a read operation may occur on the non-volatile memory device 1230, and a read failure or read retry may occur. When a read failure or read retry occurs for the non-volatile memory device 1230 during the device booting section, the storage device 1200 generates a history level update HL_UP message and sends the history level update HL_UP message to the host 1100. However, the timing of generating the history level update HL_UP message is not limited to the device booting or system booting section. For example, the storage device 1200 may generate the history level update HL_UP message even in the general runtime of the storage device 1200 after device booting or system booting is completed. In this case, the host 1100 checks the history level update HL_UP message or flag and determine whether to execute the pre-read operation PRO to adjust the optimal read voltage.

In step S200, the host 1100 and the storage device 1200 perform system booting or operating system booting according to some implementations of the present invention. In the system booting section, the host 1100 checks the history level update HL_UP message. And if a history level update HL_UP message exists, the host 1100 may instruct the storage device 1200 to perform the pre-read operation PRO. In some implementations, the host 1100 may configure the storage device 1200 to perform the pre-read operation PRO without intervention of the host 1100 through flag configuration. Then, the storage controller 1210 generates pre-read information PRI and performs the pre-read operation PRO on the non-volatile memory device 1230 based on the pre-read information PRI within the system booting section (S200). Through execution of the pre-read operation PRO, the storage device 1200 can set an optimal read voltage level for memory cells of the non-volatile memory device 1230.

In some implementations, the host 1100 may request pre-read information PRI including address information of a memory area to be the target of the pre-read operation PRO from the storage device 1200. Then, the storage device 1200 generates pre-read information PRI and provide it to the host 1100. The host 1100 may schedule the pre-read operation PRO to be performed during the idle time of the storage device 1200 within the system booting section (S200) based on the pre-read information PRI. The non-volatile memory device 1230 of the storage device 1200 may be set to the optimal read voltage level through the pre-read operation PRO performed within the system booting section (S200).

In step S300, booting of the storage system 1000 is completed and normal operation begins. When normal operation begins, the storage device 1200 may perform the read operation without read failure or read retry in response to a read request from the host 1100. This is because the non-volatile memory device 1230 has already been updated to the optimal read voltage level through the pre-read operation PRO in the system booting section (S200). Ultimately, in the normal operation mode in which user services are provided, the storage system 1000 can provide high service quality without performance degradation.

The generation of the history level update HL_UP message in the storage device 1200 and the determination and execution of the pre-read operation PRO by the host 1100 are not limited to the device booting section (S100) or the system booting section (S200). For example, the generation of the history level update HL_UP message and the pre-read operation PRO can be performed even in the normal operation (S300) section when booting is completed or in the runtime of the storage system 1000. As described above, according to the present invention, the storage system 1000, the pre-read operation PRO is performed to select the optimal read voltage level of the non-volatile memory device 1230. Accordingly, during normal operation, the storage device 1200 may prevent read failure or read retry from occurring, which results in performance degradation.

Figure 6:
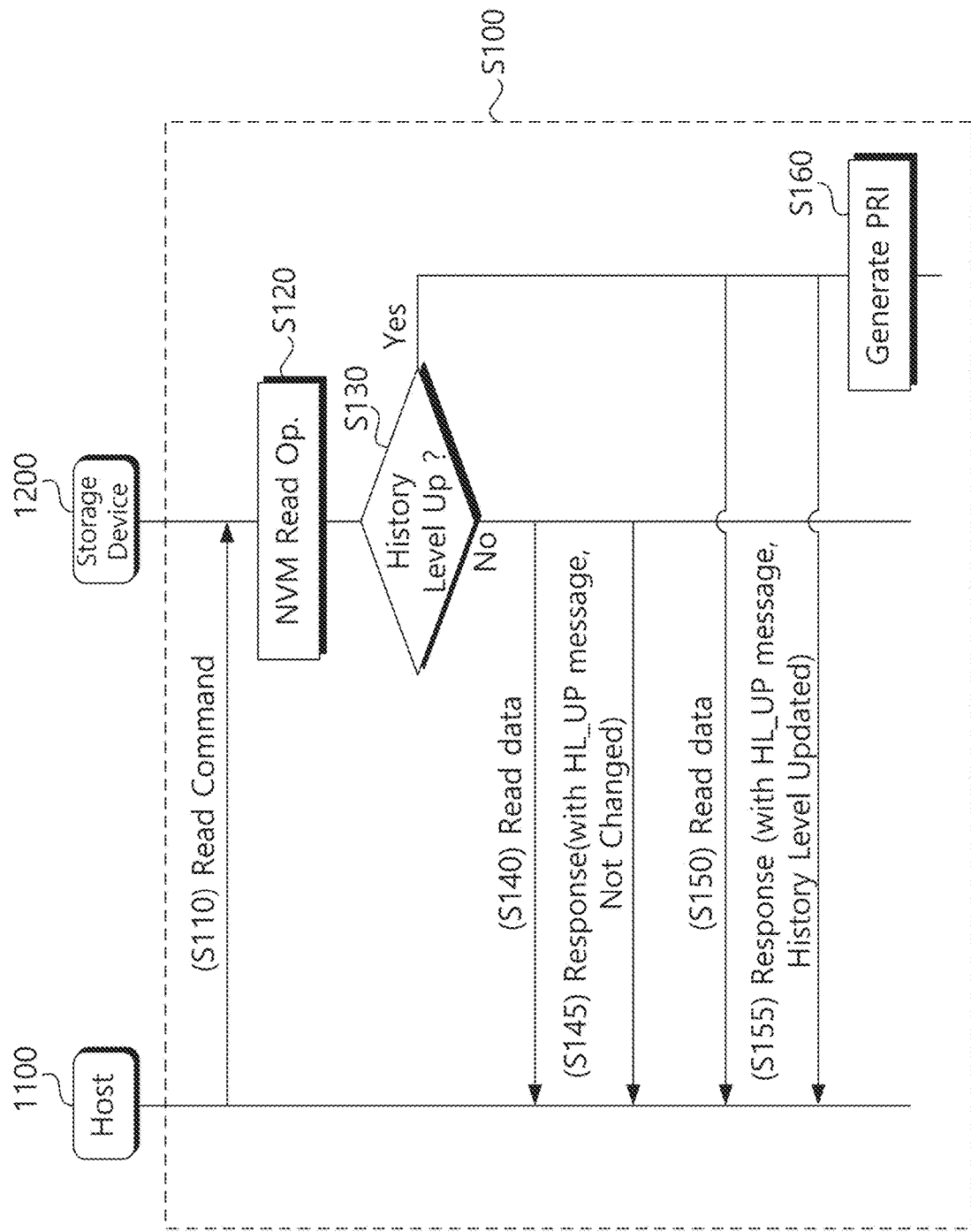
FIG. 6 is a diagram illustrating the device booting (S100) process of FIG. 5.

FIG. 6 is a diagram illustrating the device booting (S100) process of FIG. 5. Referring to FIG. 6, when the device boots (S100), the storage device 1200 checks whether a history level update has occurred due to a read failure or read retry in the non-volatile memory device 1230. Additionally, when the history level update accompanied by a change in the level of the read voltage occurs, the storage device 1200 may generate a history level update HL_UP message and transmit it to the host 1100.

In step S110, the host 1100 may provide a read command to the storage device 1200 to perform various device booting procedures. For example, if the storage device 1200 is a Universal Flash Storage (UFS) device, the host 1100 may transmit a read command UFS Protocol Information Unit (UPIU).

In step S120, the storage device 1200 performs a read operation on the memory area of the non-volatile memory device 1210 that has been requested to read in response to a request from the host 1100. If a read failure occurs due to a change in the threshold voltage of memory cells during a read operation, the non-volatile memory device 1210 performs a read retry for the corresponding memory area. A read retry refers to an operation of rereading a memory area in which a read failure has occurred by applying a read voltage of a preset changed level to be applied in the event of a read failure. When a read retry occurs, the read voltage for the corresponding memory area is adjusted to the new read voltage. And the history level indicating this change in read voltage is updated.

In step S130, the storage device 1200 checks whether the history level is updated. If there is no update of the history level ('No' direction), the procedure moves to steps S140 and S145. On the other hand, if there is an update of the History Level (in the 'Yes' direction), the procedure moves to steps S150 and S155.

In step S140, the storage device 1200 transmits the read data to the host 1100. And in step S145, the storage device 1200 transmits a response (e.g., Response UPIU) to the read command to the host 1100. At this time, the storage device 1200 transmits the response UPIU including a history level update HL_UP message indicating that the history level update has not occurred (or Not changed) to the host 1100.

In step S150, the storage device 1200 transmits data read by the changed read voltage to the host 1100. And in step S155, the storage device 1200 transmits the response UPIU including the history level update HL_UP message indicating that a history level update has occurred to the host 1100.

In step S160, the storage device 1200 may generate pre-read information PRI because an update of the history level has occurred. For example, after the history level is updated, the storage device 1200 may select not only the memory area requested to be read, but also all memory areas where data is stored as the target of the pre-read operation PRO. The address of the selected memory area may be generated as pre-read information PRI. Alternatively, the storage device 1200 may generate an address of the memory area to be accessed first after booting is completed as pre-read information PRI. The range of prior read information PRI may be set to various ranges according to the purpose. Here, although it has been described that the pre-read information PRI is generated by the storage device 1200 itself, the pre-read information PRI may be generated at the request of the host 1100, as in some implementations described later.

In the above, the procedure for transmitting the history level update HL_UP message and pre-read information PRI of the storage device 1200 during the device booting (S100) section in some implementations of the present invention has been briefly described. During the device booting (S100) section, various initialization and setup operations of the storage device 1200 occur. In particular, in the case of the storage device 1200, transmission of a history level update HL_UP message and generation of pre-read information PRI may be performed when the device is booted. It will be appreciated that in some implementations, the generation of pre-read information PRI may be triggered by the request from the host 1100.

Figure 7:
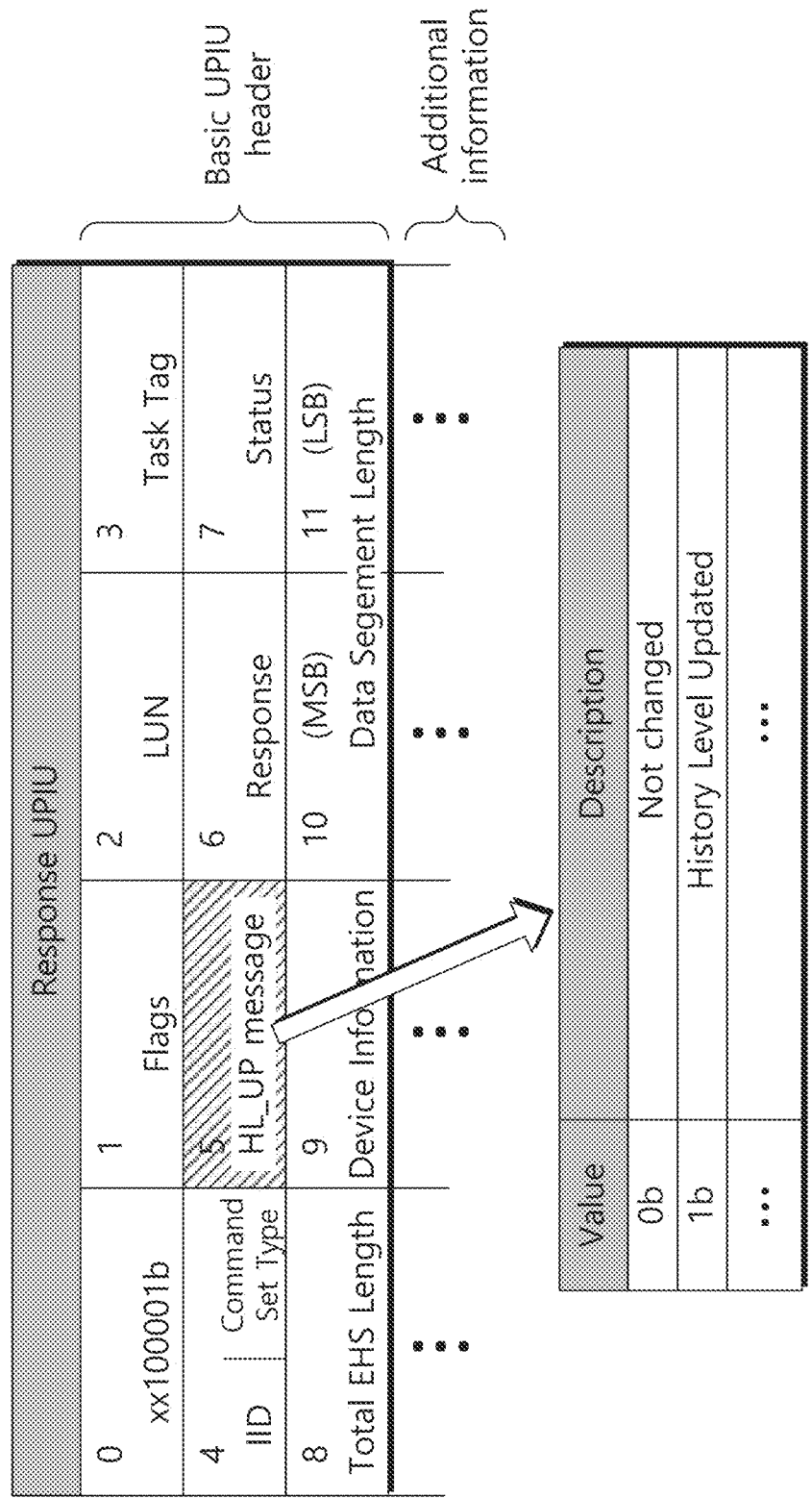
FIG. 7 is a diagram showing the response UFS Protocol Information Unit (UPIU) mentioned in step S155 of FIG. 6.

FIG. 7 is a diagram showing the response UPIU mentioned in step S155 of FIG. 6. Referring to FIG. 7, the history level update HL_UP message implemented through the UFS interface can be implemented as any one field in the response UPIU.

When the storage device 1200 transmits a response to the host 1100 using the UFS interface, the illustrated response UPIU may be defined. The response UPIU is used by the storage device 1200 to transmit information indicating the completion of the task and the status of the task to the host 1100 after completing the read task requested by the host 1100. The response UPIU consists of a basic UPIU header and additional information. In the UFS interface, a 12-byte basic UPIU header is defined.

For example, the history level update HL_UP message may be allocated to the 6th byte (Byte 5) of the Basic UPIU header. History level update HL_UP message can have a length of 1 bit. For example, if the history level update HL_UP message is provided as logic '0', it may indicate that there is no change in the read level. On the other hand, when the history level update HL_UP message is provided as logic '1', it may indicate that a change in the read level exists. Here, the history level update HL_UP message may be transmitted using spare bytes in the additional information field of the response UPIU.

FIG. 8 is a table illustrating pre-read information PRI generated in a storage device. Referring to FIG. 8, the storage device 1200 may generate pre-read information PRI when a history level update HL_UP occurs or upon a request from the host 1100.

Pre-read information PRI may be generated in the storage device 1200 in the form of a table. When the history level update HL_UP occurs for some memory areas, the storage controller 1210 may determine that the read voltage for the non-volatile memory device 1230 needs to be adjusted. Accordingly, the storage controller 1210 may select memory cells or memory areas to update the optimal read voltage level through valley search according to various criteria, and generate pre-read information PRI.

For example, the storage controller 1210 may generate the address of a memory area where valid data is stored as pre-read information PRI. In some other implementations, the storage controller 1210 may generate the address of a memory area that is typically accessed first after booting is completed as pre-read information PRI. In some other implementations, the storage controller 1210 may generate addresses of all memory areas of the non-volatile memory device 1230 as pre-read information PRI. The criteria for selecting a memory area that is the target of pre-read information PRI may vary depending on various purposes.

In an example scenario, the storage controller 1210 creates an address of memory area in which valid data is stored as pre-read information PRI. The storage controller 1210 may refer to the address mapping table to generate the address of a page or memory block where valid data is stored as pre-read information PRI_0 to PRI_31. Then, the pre-read operation PRO or valley search operation may be performed later based on the generated pre-read information PRI_0 to PRI_31.

Figure 9:
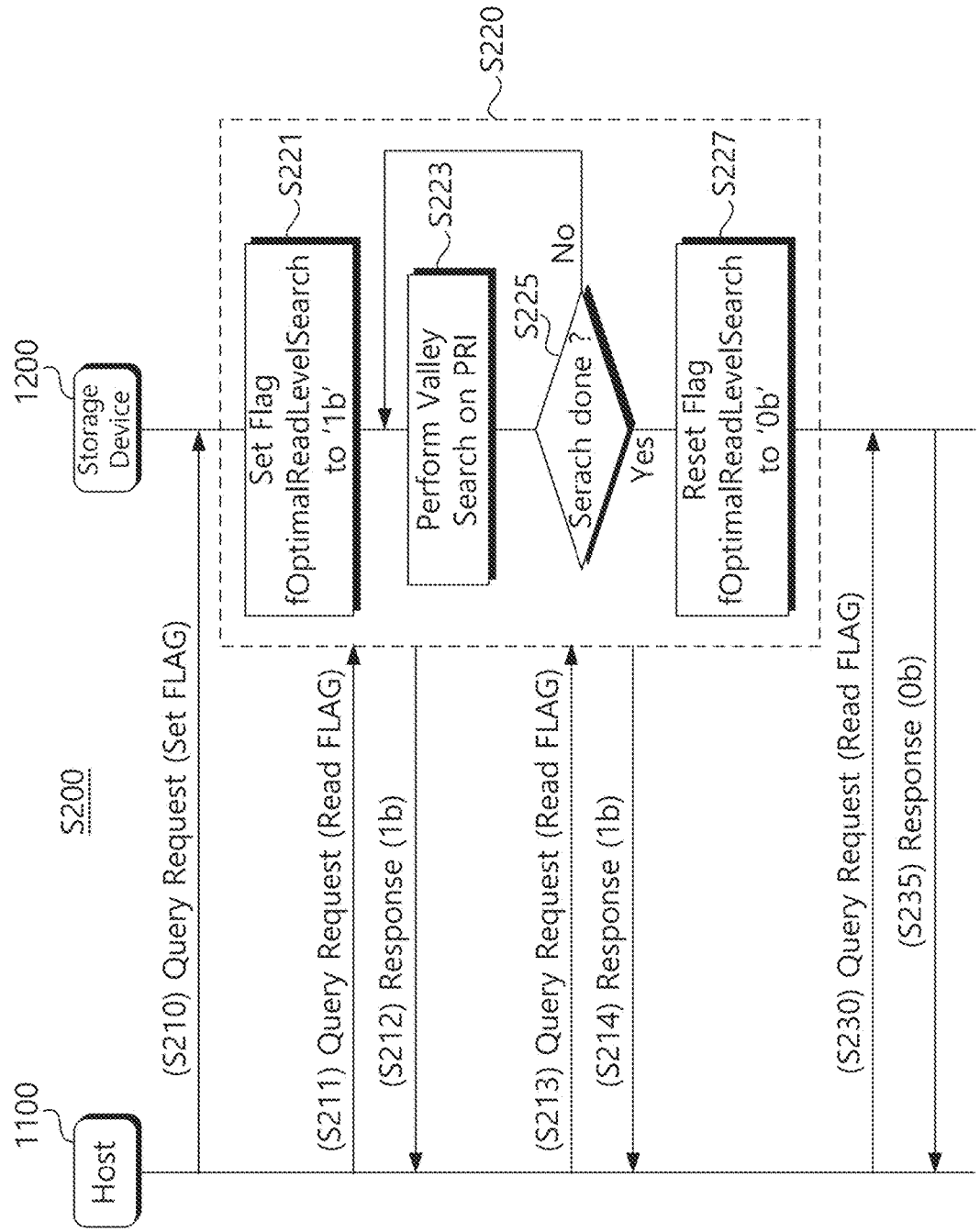
FIG. 9 is a diagram showing the system booting process according to some implementations of the present invention.

FIG. 9 is a diagram showing a system booting procedure according to some implementations of the present invention. Referring to FIG. 9, the host 1100 may instruct a pre-read operation PRO of the storage device 1200 by setting a flag. Then, the storage device 1200 can perform the pre-read operation PRO such as valley search during the system booting (S200) section.

In step S210, the host 1100 sets a flag to activate the pre-read operation PRO of the storage device 1200. For this purpose, the host 1100 may use the query request UPIU of the UFS interface.

Step S220 shows the procedure of the pre-read operation PRO performed by the storage device 1200 without the intervention of the host 1100. The storage device 1200 sets the flag 'fOptimalReadLevelSearch' in response to the flag setting request from the host 1100 and then performs the pre-read operation PRO using valley search.

In step S221, the storage device 1200 sets the flag 'fOptimalReadLevelSearch' to logic '1' according to the flag setting request from the host 1100.

In step S223, the storage device 1200 performs the valley search on the memory area of the non-volatile memory device 1230 based on the prior read information PRI. Valley search is performed by counting the number of memory cells while varying the read voltage of the memory cells. Valley search will be explained in detail with reference to FIG. 11 described later. A distribution valley where the minimum number of memory cells are distributed may be selected according to the count results of memory cells for each read voltage. And the read voltage corresponding to the distribution valley may be updated to a new read voltage for the corresponding program state of the memory cells.

In step S225, the storage device 1200 determines whether valley search for the memory area or memory cells listed in the prior read information PRI has been completed. When valley search for all memory areas specified in the pre-read information PRI is completed ('Yes' direction), the procedure moves to step S227. On the other hand, if there is still an area requiring valley search among the memory areas specified in the pre-read information PRI ('No' direction), the procedure returns to step S223. In step S223, a valley search for the remaining memory area follows.

In step S227, the storage device 1200 resets the flag 'fOptimalReadLevelSearch' to logic '0' because valley search for all memory areas indicated by the prior read information PRI is completed. While the flag 'fOptimalReadLevelSearch' remains at logic '1', a Read FLAG query request from the host 1100 may occur. For example, in step S211, the host 1100 may transmit a query request to the storage device 1200 to check the status of the flag 'fOptimalReadLevelSearch'. Then, the storage device 1200 returns a flag value of '1' as a query response. And in step S213 before valley search is completed, the host 1100 may transmit a query request to the storage device 1200 to check the status of the flag 'fOptimalReadLevelSearch'. Then, the storage device 1200 returns a flag value of '1' to the host 1100 as a query response, indicating that valley search is in progress.

On the other hand, a flag read query request from the host 1100 may be transmitted after the flag 'fOptimalReadLevelSearch' is reset to logic '0' as in step S230. Then, the storage device 1200 returns the flag value of '0' to the host 1100 as a query response. Then, the host 1100 can identify that the valley search of the storage device 1200 has been completed when the flag 'fOptimalReadLevelSearch' is in the logic '0' state.

In the above, a procedure for triggering the pre-read operation PRO of the storage device 1200 through setting the flag of the host 1100 has been described. According to the pre-read operation performed according to the flag setting, there is no transmission of read data to the host 1100. Therefore, there is no performance degradation in the system booting (S200) section due to the execution of the pre-reading operation (S220).

FIG. 10 is a table defining the flag 'fOptimalReadLevelSearch' indicating whether a pre-read operation PRO is completed in the UFS storage device. Referring to FIG. 10, the flag 'fOptimalReadLevelSearch' may be defined as a 1-bit logic value indicating whether the pre-read operation PRO of the storage device 1200 is in progress or completed.

The flag identification number IDN of the flag 'fOptimalReadLevelSearch' may be set to any number 'xxh' among reserved IDN among many flags. The flag name 'fOptimalReadLevelSearch' refers to an operation such as valley search in the storage device 1200 to search for the optimal read voltage of the non-volatile memory device 1230. And the access type of the flag 'fOptimalReadLevelSearch' is set 'Set only' in the host 1100, indicating that reading is possible through a status request such as a query request from the host 1100. And the type 'D' of the flag 'fOptimalReadLevelSearch' indicates that it is a device level flag. The default value of flag 'fOptimalReadLevelSearch' can be provided as logic '0'.

In summary, when the host 1100 sets the flag 'fOptimalReadLevelSearch' to logic '1', the storage device 1200 performs the pre-read operation PRO to search for the optimal read level during an idle time. And when the pre-read operation PRO for searching the optimal read level is completed, the storage device 1200 may reset the value of the flag 'fOptimalReadLevelSearch' to logic '0'.

In the above, as an example of the pre-read operation PRO, a method of searching for the optimal read voltage is performed by setting the flag of the host 1100. However, the request method for searching for the optimal read voltage is not limited to the above-described method. For example, the pre-read operation PRO setting method for searching for the optimal read voltage can be implemented not only through flag setting but also through attribute setting or various query requests UPIU.

Figure 11:
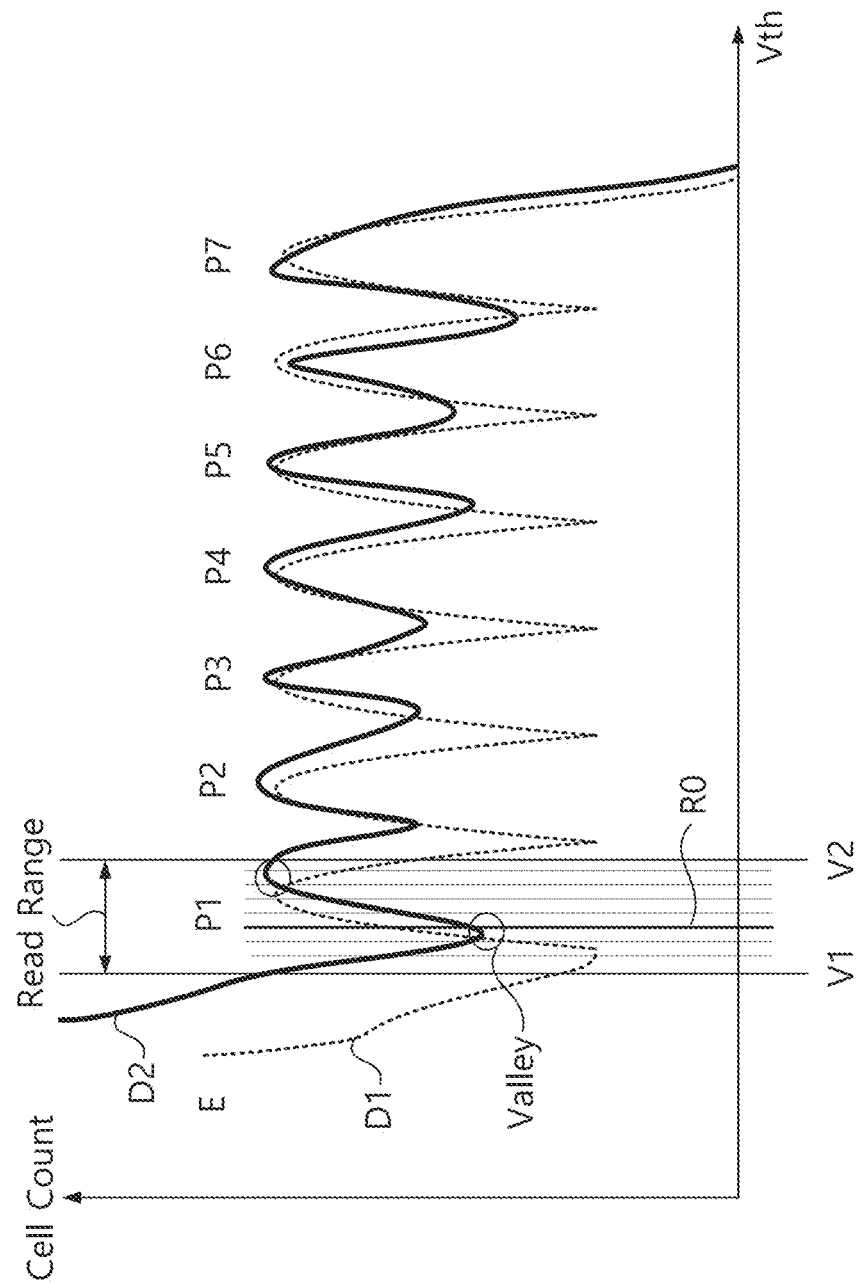
FIG. 11 is a diagram illustrating an example of a valley search operation of a non-volatile memory device to search for an optimal read voltage.

FIG. 11 is a diagram illustrating an example of a valley search operation of a non-volatile memory device to search for an optimal read voltage. Referring to FIG. 11, for simplicity of explanation, a valley search operation will be explained using triple level cell TLC as an example. However, the advantages of the present disclosure can be equally applied to multi-level cell MLC, quad level cell QLC, or higher multi-bit memory cells.

In the case of TLC, memory cells can be programmed to an erase state 'E' and one of seven program states 'P1' to 'P7'. In general, in the storage device 1200 (see FIG. 1), the threshold voltage of the memory cells of the non-volatile memory device 1230 may be formed as the first distribution D1 shown in a dotted line immediately after programming. However, due to retention characteristics, as time passes, the threshold voltages of memory cells may change in a form similar to the second distribution D2 shown in a solid line. Therefore, if the level of the read voltage is not adjusted according to the change in the threshold voltage, the reliability of the data is damaged.

The storage device 1200 can search for and determine the optimal read voltage through the pre-read operation PRO. It can be seen that the location of the valley between the erase state 'E' and the program state 'P1' has changed due to the retention characteristics. Therefore, valley search, which is an example of the pre-read operations PRO, can be performed. For example, a plurality of read voltages between the threshold voltage ranges V1 to V2 can be used to find the valley between the erase state 'E' and the program state 'P1'. After sensing memory cells using a plurality of read voltages, the read voltage corresponding to the minimum cell count corresponds to the valley. The read voltage (e.g., R0) corresponding to the distribution valley may be updated to the optimal read voltage. This valley search can be used to search for each distribution valley located between program states 'P1' to 'P7'.

The valley search method, which is an example of the pre-read operation PRO, has been exemplarily explained through FIG. 11 above. When the flag 'fOptimalReadLevelSearch' is set to logic '1', the storage device 1200 can perform the above-described pre-read operation PRO on memory areas specified in the pre-read information PRI. Through the pre-read operation PRO, the read voltage of memory cells of the non-volatile memory device 1230 may be updated to the optimal read voltage.

Figure 12:
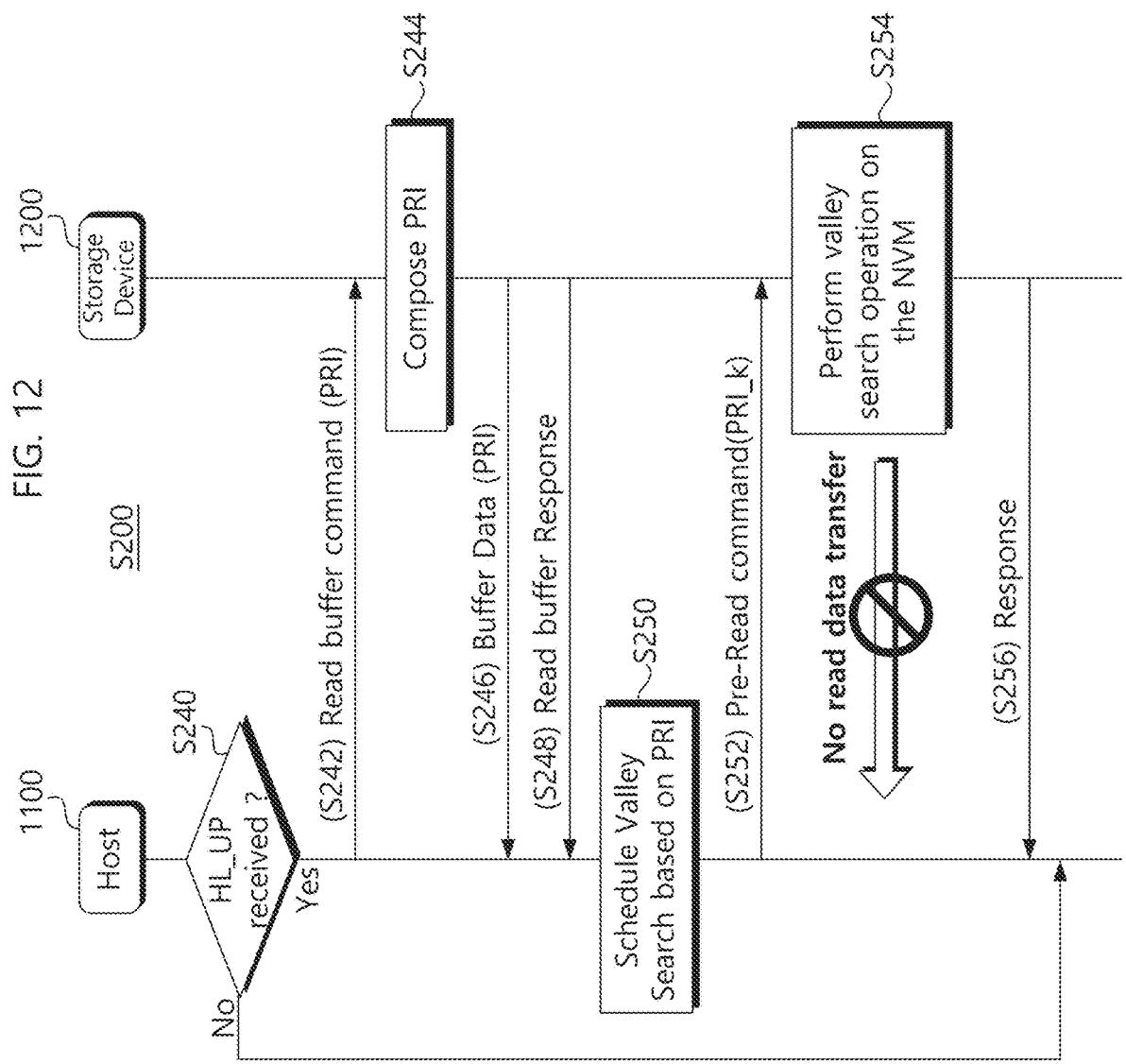
FIG. 12 is a diagram showing the system booting process according to some implementations of the present invention.

FIG. 12 is a diagram showing the system booting process according to some implementations of the present invention. Referring to FIG. 12, the host 1100 may schedule a pre-read operation PRO in the system booting section using pre-read information PRI. In other words, the host 1100 can control the storage device 1200 to perform the pre-read operation PRO during the idle time of the storage device 1200 during the system booting section.

In step S240, the host 1100 checks whether a history level update HL_UP message is received from the storage device 1200 during the device booting sequence. If the history level update HL_UP message is not received ('No' direction), no additional action related to the pre-read operation PRO is taken in the system booting section. In other words, the pre-read operation PRO can be skipped. On the other hand, if the history level update HL_UP message is received ('Yes' direction), the procedure moves to step S242.

In step S242, the host 1100 transmits a buffer read command to request pre-read information PRI from the storage device 1200. That is, the host 1100 requests pre-read information PRI generated in the buffer memory 1250 (see FIG. 3) rather than accessing the non-volatile memory device 1230.

In step S244, the storage device 1200 prepares or composes pre-read information PRI in response to the request from the host 1100. If the pre-read information PRI is not composed in the device booting section, the storage device 1200 configures the address of the memory area to be searched for the optimal read voltage as the pre-read information PRI. The configured pre-read information PRI may be stored in the buffer memory 1250.

In step S246, the storage device 1200 transmits pre-read information PRI composed in the buffer memory 1250 to the host 1100. And in step S248, the storage device 1200 transmits a UPIU response to the buffer read command to the host 1100.

In step S250, the host 1100 schedules the pre-read operation PRO within the system booting section based on the received pre-read information PRI. In other words, the host 1100 may schedule the pre-read operation PRO to be performed during idle time when there is no access to the storage device 1200 in the system booting section.

In step S252, the host 1100 transmits the pre-read command to the storage device 1200. At this time, the host 1100 may instruct the pre-read operation PRO for all memory areas included in the pre-read information PRI. In some other implementations, the host 1100 may instruct the storage device 1200 to perform the pre-read operation PRO in an amount that can be performed during idle time. That is, the host 1100 may transmit the pre-read command multiple times and receive the response UPIU multiple times.

In step S254, the storage device 1200 performs the pre-read operation PRO such as valley search on the non-volatile memory device 1230 according to the host's request. However, even if the pre-read operation PRO progresses or is completed, the information about the optimal read voltage generated as a result is only updated inside the storage device 1200, and there is no read data transmission to the host 1100.

In step S256, when the requested pre-read operation PRO is completed, the storage device 1200 may transmit a response UPIU to the host 1100. The response UPIU may include a message indicating completion of the pre-read operation PRO.

In the above, the pre-read operation PRO procedure performed in the storage device 1200 during the system booting (S200) section has been briefly described. Even if the pre-read operation PRO is being executed or completed, there is no read data transmission from the storage device 1200 to the host 1100. Therefore, no degradation in booting performance occurs during the system booting section.

Figure 13:
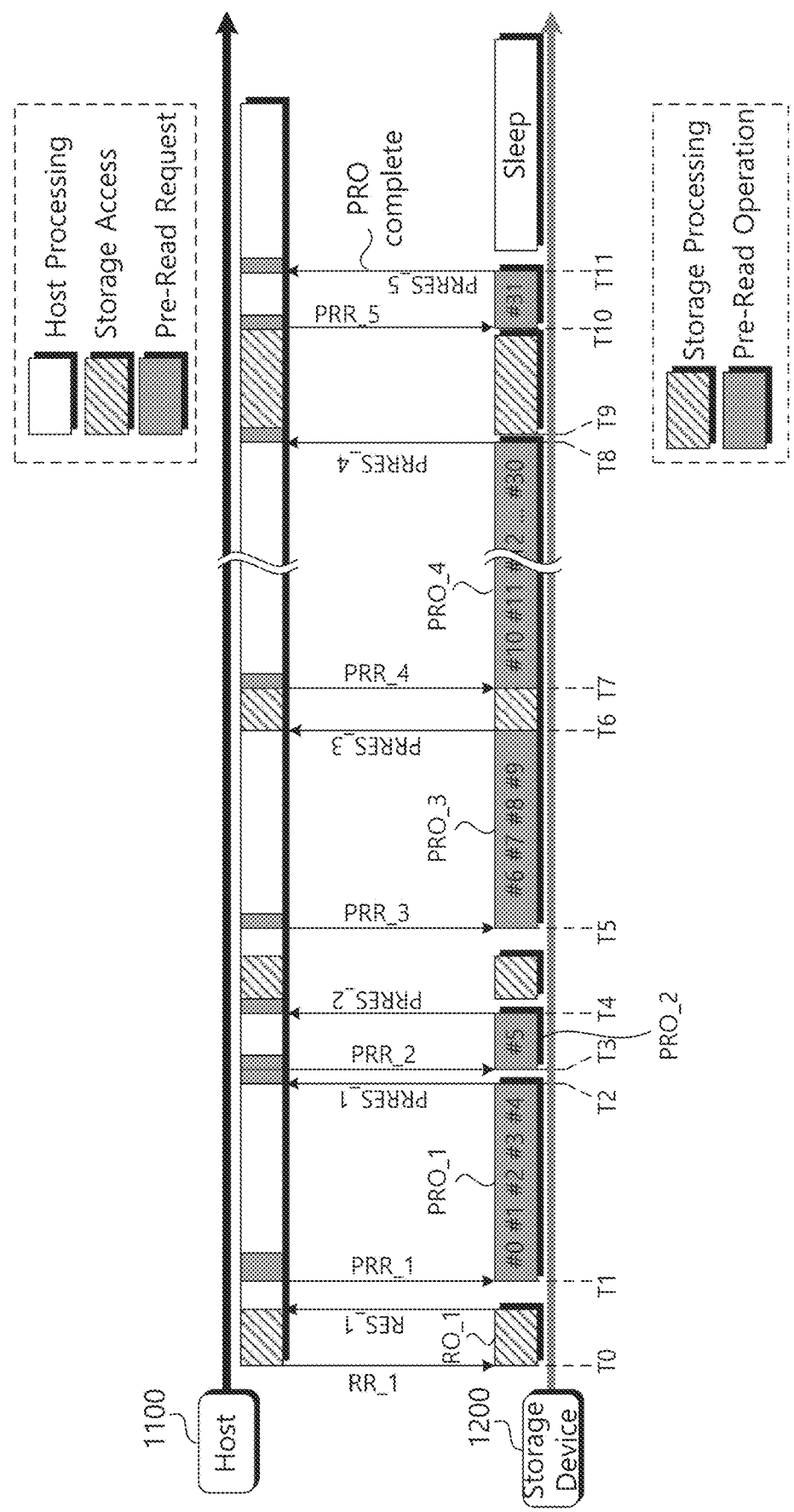
FIG. 13 is a timing diagram showing a pre-read operation method of a host and a storage device during a system booting section according to some implementations of the present invention.

FIG. 13 is a timing diagram showing a transaction for a pre-read operation between a host and a storage device during a system booting section according to some implementations of the present invention. Referring to FIG. 13, the host 1100 may schedule the system booting operation by allocating a pre-read operation PRO to the idle time of the storage device 1200. Here, it is assumed that the pre-read information PRI corresponds to 32 memory areas #0 to #31.

At time T0, the host 1100 performs an access operation to the storage device 1200. For example, the host 1100 may transmit a read request RR_1 to the storage device 1200. Then, the storage device 1200 executes a read operation RO_1 on the selected memory area in response to the read request RR_1. Then, the storage device 1200 transmits read data and a read response RES_1, which are the results of the read operation RO_1, to the host 1100.

At time T1, the host 1100 may transmit a pre-read request PRR_1 to the storage device 1200. Then, the storage device 1200 performs a pre-read operation PRO_1 on the indicated memory area #0 to #4 in response to the pre-read request PRR_1. The pre-read operation PRO_1 includes an operation to search for the optimal read voltage, such as valley search, for the indicated memory area #0 to #4. And when the pre-read operation PRO_1 is completed, the storage device 1200 transmits a response PRRES_1 to the pre-read request PRR_1 to the host 1100 at time T2. At this time, there is no transmission of read data generated in the pre-read operation PRO_1 to the host 1100.

At time T3, the host 1100 may transmit a pre-read request PRR_2 to the storage device 1200. Then, the storage device 1200 performs a pre-read operation PRO_2 on the indicated memory area #5 in response to the pre-read request PRR_2. When the pre-read operation PRO_2 is completed, the storage device 1200 transmits a response PRRES_2 to the pre-read request PRR_2 to the host 1100 at time T4. At this time, there is no transmission of read data generated in the pre-read operation PRO_2 to the host 1100.

At time T5, the host 1100 may transmit a pre-read request PRR_3 to the storage device 1200. Then, the storage device 1200 performs a pre-read operation PRO_3 on the indicated memory areas #6 to #9 in response to the pre-read request PRR_3. The pre-read operation PRO_3 includes an operation to search for the optimal read voltage, such as valley search, for the indicated memory area #6 to #9. And when the pre-read operation PRO_3 is completed, the storage device 1200 transmits a response PRRES_3 to the pre-read request PRR_3 to the host 1100 at time T6. At this time, there is no transmission of read data generated in the pre-read operation PRO_3 to the host 1100.

At time T7, the host 1100 may transmit a pre-read request PRR_3 to the storage device 1200. Then, the storage device 1200 performs a pre-read operation PRO_4 on the indicated memory area #10 to #30 in response to the pre-read request PRR_3. In the pre-read operation PRO_4, a valley search operation may be performed for the indicated memory area #10 to #30. And when the pre-read operation PRO_4 is completed, the storage device 1200 transmits a response PRRES_4 to the pre-read request PRR_4 to the host 1100 at time T8. At this time, there is no transmission of read data generated in the pre-read operation PRO_4 to the host 1100.

At point T9, processing of the host 1100 and the storage device 1200 occurs due to an access operation other than a pre-read operation.

At time T10, the host 1100 may transmit a pre-read request PRR_5 for the last memory area #31 of the pre-read information PRI to the storage device 1200. Then, the storage device 1200 performs a pre-read operation PRO on the indicated memory area #31 in response to the pre-read request PRR_5. And when the pre-read operation is completed, the storage device 1200 transmits a response PRRES_5 to the pre-read request PRR_5 to the host 1100 at time T11. At this time, there is no transmission of read data to the host 1100. All pre-read operations of the storage device 1200 are completed through transmission of the response PRRES_5 to the pre-read request at time T11 to the host 1100.

As shown in the timing diagram, the host 1100 may schedule to perform the pre-read operation PRO by utilizing the idle time of the storage device 1200 during the system booting section. After device booting is completed, it is known that the access time to the storage device 1200 during the system booting section is only about 10% of the entire system booting section. Therefore, the storage device 1200 is in an idle state for 90% of the time during the system booting section. Since the pre-read operation is performed in this idle state, system booting performance will not be degraded due to the pre-read operation.

Figure 14:
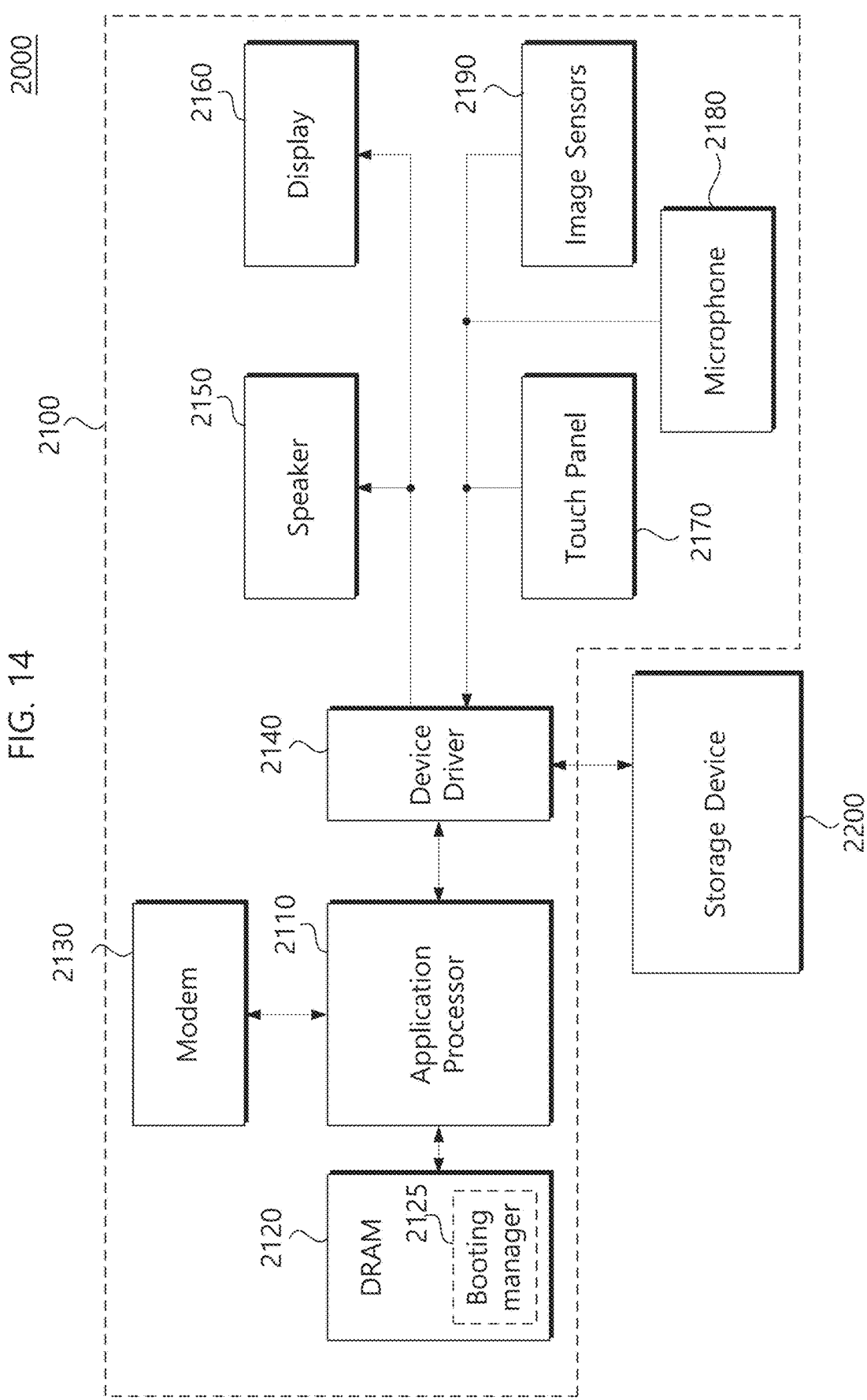
FIG. 14 is a block diagram showing the storage system 2000 according to some implementations of the present invention in more detail.

FIG. 14 is a block diagram showing the storage system 2000 according to some implementations of the present invention in more detail. Referring to FIG. 14, the storage system 2000 includes a host 2100 and a storage device 2200. The host 2100 and the storage device 2200 may operate as described with reference to FIGS. 1 to 13.

The host 2100 includes an application processor 2110, DRAM 2120, modem 2130, device driver 2140, speaker 2150, display 2160, touch panel 2170, microphone 2180, and image sensors 2190.

The application processor 2110 can execute applications and file systems. The application processor 2110 may use the DRAM 2120 as system memory. The application processor 2110 can communicate with an external device wired or wirelessly through the modem 2130. By way of example, the modem 2130 may be built into the application processor 2110.

The application processor 2110 may communicate with peripheral devices through the device driver 2140. For example, the application processor 2110 can communicate with the speaker 2150, display 2160, touch panel 2170, microphone 2180, image sensors 2190, and storage device 2200 through the device driver 2140.

Device driver 2140 may include a device manager, UFS application layer, UFS transport protocol layer, and UFS interconnect layer. By way of example, the device driver 2140 may be built into the application processor 2110.

The speaker 2150 and the display 2160 may be user output interfaces that deliver information to the user. The touch panel 2170, microphone 2180, and image sensors 2190 may be user input interfaces that receive information from the user.

In particular, the booting manager 2125 according to some implementations of the present invention may be loaded into the DRAM 2120. As the booting manager 2125 is executed, the boot schedule of the storage system 2000 may be managed based on pre-read information PRI provided from the storage device 2200 during a booting operation. In other words, the booting manager 2125 may request a pre-read operation PRO during the idle time of the storage device 2200 during the booting operation. In some other implementations, the storage device 2200 may itself perform the pre-read operation PRO during the system booting section according to the execution of the booting manager 2125.

According to the above-described configuration, the storage system 2000 can perform the pre-read operation PRO to search and set the optimal read voltage of the storage device 2200 during the booting section. Accordingly, performance degradation due to read failures or read retries according to retention characteristics that may occur in the storage device 2200 can be prevented by the pre-read operation PRO performed in the booting section.

While this disclosure contains many specific implementation details, these should not be construed as limitations on the scope of what may be claimed. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a combination can in some cases be excised from the combination, and the combination may be directed to a subcombination or variation of a subcombination.

The above are specific implementations for carrying out the present invention. In addition to the above-described implementations, the present invention may include simple design changes or easily changeable implementations. In addition, the present invention may include techniques that can be easily modified and implemented using the implementations. Therefore, the scope of the present invention should not be limited to the above-described implementations, and should be defined by the claims and equivalents of the claims of the present invention as well as the claims to be described later.

What is claimed is:

1. A method of booting a storage system, comprising:
performing device booting of a storage device, the storage device including a non-volatile memory device;
determining whether a history level update message is transmitted from the storage device to a host during the device booting, wherein the history level update message indicates that a read failure or a read retry has occurred in the non-volatile memory device; and
requesting, by the host, the storage device to perform a pre-read operation to adjust an optimal read level of the non-volatile memory device according to the history level update message,
wherein the pre-read operation is performed during a system booting duration of the storage system.

2. The method of claim 1, wherein the history level update message is transmitted in response to a read command, wherein the read command is sent by the host to the storage device during the device booting.

3. The method of claim 1, wherein requesting the storage device to perform the pre-read operation comprises setting a flag in the storage device by the host.

4. The method of claim 3, wherein setting the flag comprises transmitting a flag setting to the storage device through a query request UFS Protocol Information Unit (UPIU) of a Universal Flash Storage (UFS) interface.

5. The method of claim 4, further comprising:
performing, by the storage device, a valley search on the non-volatile memory device in response to the flag setting.

6. The method of claim 5, further comprising:
resetting the flag by the storage device based on the valley search being completed.

7. The method of claim 1, further comprising scheduling and executing the pre-read operation by the host based on pre-read information provided from the storage device.

8. The method of claim 7, wherein the pre-read information includes address information about a memory area in which valid data of the non-volatile memory device is stored.

9. The method of claim 7, wherein the host is configured to schedule the pre-read operation to be performed during an idle time of the storage device in the system booting duration.

10. The method of claim 9, wherein the pre-read operation is performed without transmitting read data from the storage device to the host.

11. The method of claim 7, wherein requesting the storage device to perform the pre-read operation comprises transmitting a request to the storage device using a buffer read command UFS Protocol Information Unit (UPIU) of a Universal Flash Storage (UFS) interface.

12. A storage device, comprising:
a non-volatile memory device; and
a storage controller configured to generate a history level update message and transmit the history level update message to a host, based on a read failure or read retry event of the non-volatile memory device occurring during a booting operation,
wherein the history level update message indicates that a read level change has occurred, and
wherein the storage controller is configured to control the non-volatile memory device to perform an operation to set an optimal read level of the non-volatile memory device in response to a pre-read operation request from the host.

13. The storage device of claim 12, wherein the storage controller is configured to receive the pre-read operation request through a flag setting from the host.

14. The storage device of claim 13, wherein the storage controller is configured to receive the flag setting from the host through a query request universal flash storage (UFS) protocol information unit (UPIU) of a UFS interface.

15. The storage device of claim 14, wherein the storage controller is configured to perform the pre-read operation in response to the flag setting, and wherein the storage controller is configured to reset the flag setting upon completion of the pre-read operation.

16. The storage device of claim 12, wherein the storage controller is configured to perform a valley search operation based on pre-read information including address information of a memory area in which valid data of the non-volatile memory device is stored.

17. The storage device of claim 16, wherein the operation to set the optimal read level of the non-volatile memory device is performed during the booting operation according to scheduling of the host.

18. The storage device of claim 16, wherein the storage controller is configured to provide the pre-read information to the host in response to a buffer read command from the host.

19. A method of booting a storage system, comprising:
resetting a hardware of a storage device and a host, the host being configured to control the storage device;
performing booting of the storage device;
checking, by the host, whether a read level update message of a non-volatile memory device is received from the storage device during a booting duration of the storage device;
generating, by the storage device, pre-read information to apply a read level update to one or more memory areas of the non-volatile memory device; and
requesting, by the host and from the storage device, a pre-read operation to adjust an optimal read level of the non-volatile memory device,
wherein the pre-read operation is performed during a system booting duration of the storage system.

20. The method of claim 19, wherein requesting the pre-read operation comprises at least one of: setting a flag through a universal flash storage (UFS) interface, or transmitting a pre-read command.

* * * * *